United States Patent [19]

Zweiniger et al.

[11] Patent Number: 4,630,857
[45] Date of Patent: Dec. 23, 1986

[54] STORAGE APPARATUS FOR MOTOR VEHICLES

[75] Inventors: Hansjurgen Zweiniger; Horst Willenbrock, both of Cologne, Fed. Rep. of Germany

[73] Assignee: Ford Motor Company, Dearborn, Mich.

[21] Appl. No.: 808,134

[22] Filed: Dec. 12, 1985

[30] Foreign Application Priority Data

Dec. 12, 1984 [DE] Fed. Rep. of Germany ....... 3445211

[51] Int. Cl.$^4$ .............................................. B60R 7/06
[52] U.S. Cl. ................... 296/37.12; 224/282; 312/325
[58] Field of Search ............... 296/37.12, 37.9; 312/325; 224/282

[56] References Cited

U.S. PATENT DOCUMENTS 2,883,234  4/1959  Biondo ................ 296/37.12
3,386,765  6/1968  Drach, Jr. ............ 296/37.12

FOREIGN PATENT DOCUMENTS 49716  4/1982  European Pat. Off. .

Primary Examiner—Robert R. Song
Attorney, Agent, or Firm—D. M. Stock; C. L. Sadler

[57] ABSTRACT

A storage apparatus carried inside interior panels of motor vehicles is provided. The apparatus has a storage container which is open towards the interior of the panel and which is movable forwardly and downwardly in through guide levers arranged in a parallelogram. The apparatus overcomes dead center in a closed position flush with the panel and is spring-mounted on first stops through lever arms articulated on the panel at one end and on the storage container at the other end and is further mounted by a spring and shock absorber arrangement cooperating with the guide levels which is lockable on two stops in an opened position projecting from the panel. Specifically, two forward, laterally outer lever arms and a rear, triangularly shaped lever arm disposed parallel to the approximately vertical rear wall of the container are provided, and a spring and bell-crank lever arrangement engages below on a support point mounting on the panel and above on a transverse bar of the triangularly shaped lever arm.

8 Claims, 6 Drawing Figures

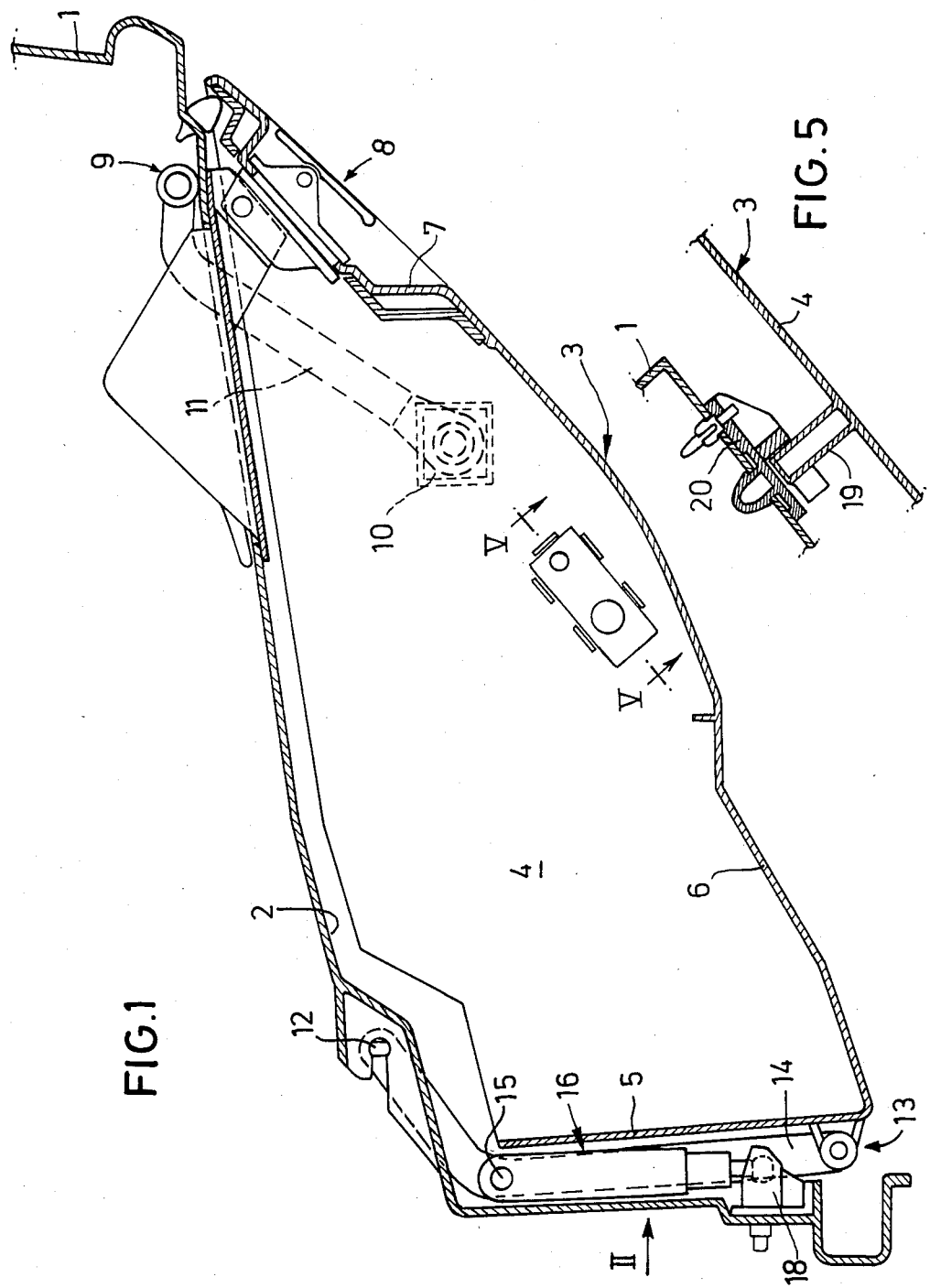

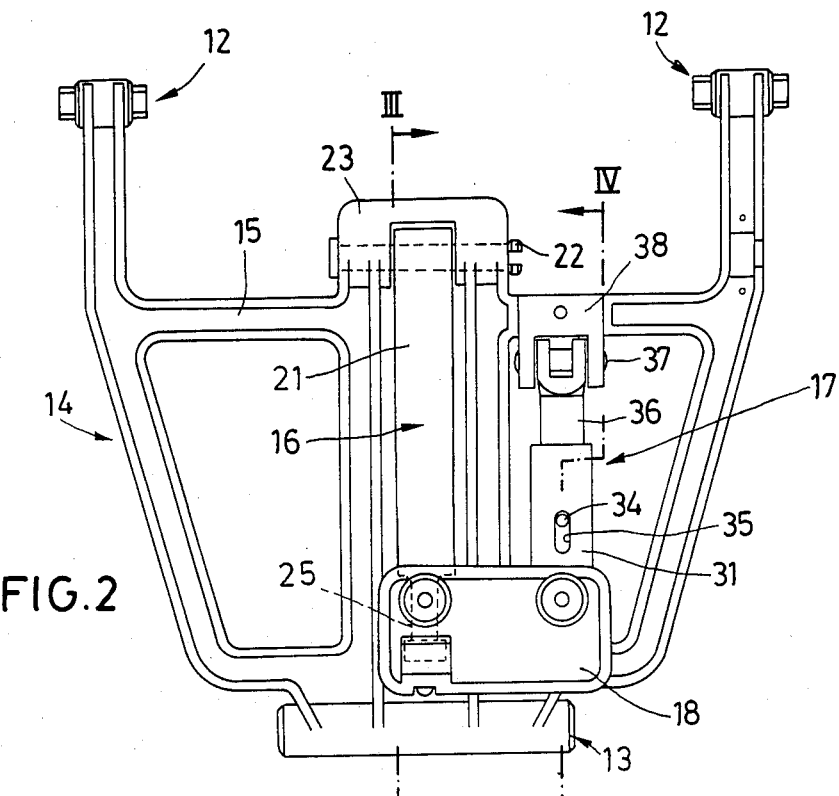
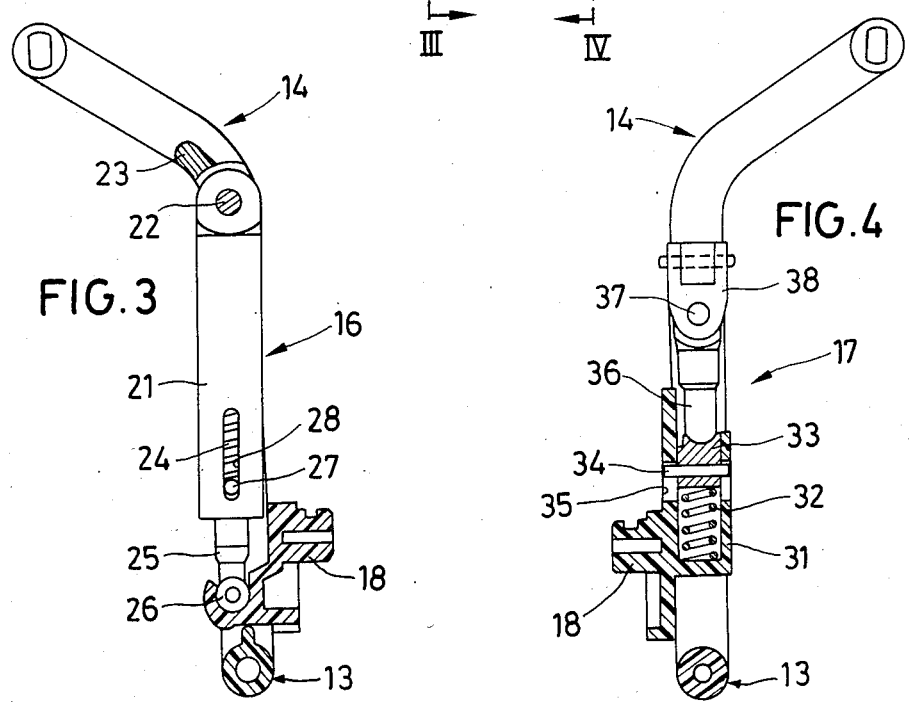

STORAGE APPARATUS FOR MOTOR VEHICLES

BACKGROUND OF THE INVENTION

This invention relates to a storage apparatus carried inside an interior panel of a motor vehicle, of the type (such as shown in European Application 0049716) in which the storage container is open toward the interior of the panel and is movable forwardly and downwardly through a guide mechanism arranged as a parallelogram defining a four-bar linkage. From a closed position in which the container is flush, it moves past a dead center position where it is spring mounted through lever arms and has its final travel limited by stops positioned between the container and adjacent portions of the interior panel of the motor vehicle. The lever arms are articulated on the panel at one end and on the container at the other. The container is mounted through a spring and shock absorber arrangement which is lockable at two stops in an open position.

In the known storage apparatus, which is the subject of EP No. 0049716, pairs of lever arms lying parallel to the side walls of the storage container are disposed inside the storage container, at least one pair of lever arms cooperating with a spring and shock absorber arrangement.

The known storage apparatus has the disadvantage that the pairs of lever arms disposed laterally inside the storage container can adversely affect the accommodation of articles and can become caught on bulky articles, as a result of which the use and operation of the storage apparatus is impaired.

In addition, the manufacturing expense is relatively substantial, and the storage container is moved from its closed position into only one opened position.

SUMMARY OF THE INVENTION

One object of the present invention is to provide an improved storage apparatus to be carried within interior panels in motor vehicles in such a way that the manufacturing expense and the operational reliability of the storage apparatus is increased, while only an absolutely necessary number of lever arms outside the storage container is provided. It is a further object to improve such an apparatus by providing a controlled opening movement with two different opening positions.

By virtue of the fact that two forward, laterally outer lever arms and a rear, triangularly shaped lever arm disposed parallel to an approximately vertical rear wall of the storage container of the apparatus are provided, and spring and bell-crank lever arrangements are provided which engage at their lower ends a portion of the interior panel and at their upper ends a transverse bar of the triangularly shaped lever arm, the desired functioning of the storage apparatus is made possible with a minimum of lever arms disposed outside the storage container.

According to a feature of the invention, the stops required for fixing the closed and the opened positions of the container are formed by conventional stop buffers for the storage container and by molded stop members which are clipped onto the outside of the lateral walls of the storage container and which cooperate with parts of the interior panel of the motor vehicle.

By means of the configuration of the spring and bell-crank arrangement and the molded stop parts, two different settings of the opening position of the storage container are made available, a slightly opened position suitable for rapid removal of articles, and a fully opened position suitable for searching for or arranging articles in the storage container.

BRIEF DESCRIPTION OF THE DRAWINGS

The invention is described in greater detail with reference to one exemplary embodiment illustrated in the accompanying drawings, in which:

FIG. 1 is a vertical cross-sectional view taken through a storage apparatus inside an interior panel of a motor vehicle, a glove compartment in a vehicle instrument panel being here illustrated;

FIG. 2 is a view of the spring and bell-crank lever arrangement as arranged between the triangularly shaped lever arm and the support mounting disposed on the adjacent panel as viewed in the direction of arrow II in FIG. 1;

FIG. 3 is a cross-sectional view of the triangularly shaped lever arm taken along line III—III in FIG. 2;

FIG. 4 is a cross-sectional view of the triangularly shaped lever arm taken along line IV—IV in FIG. 2.

FIG. 5 is a cross-sectional view taken along line V—V in FIG. 1; and

DESCRIPTION OF A PREFERRED EMBODIMENT

Figure 6:
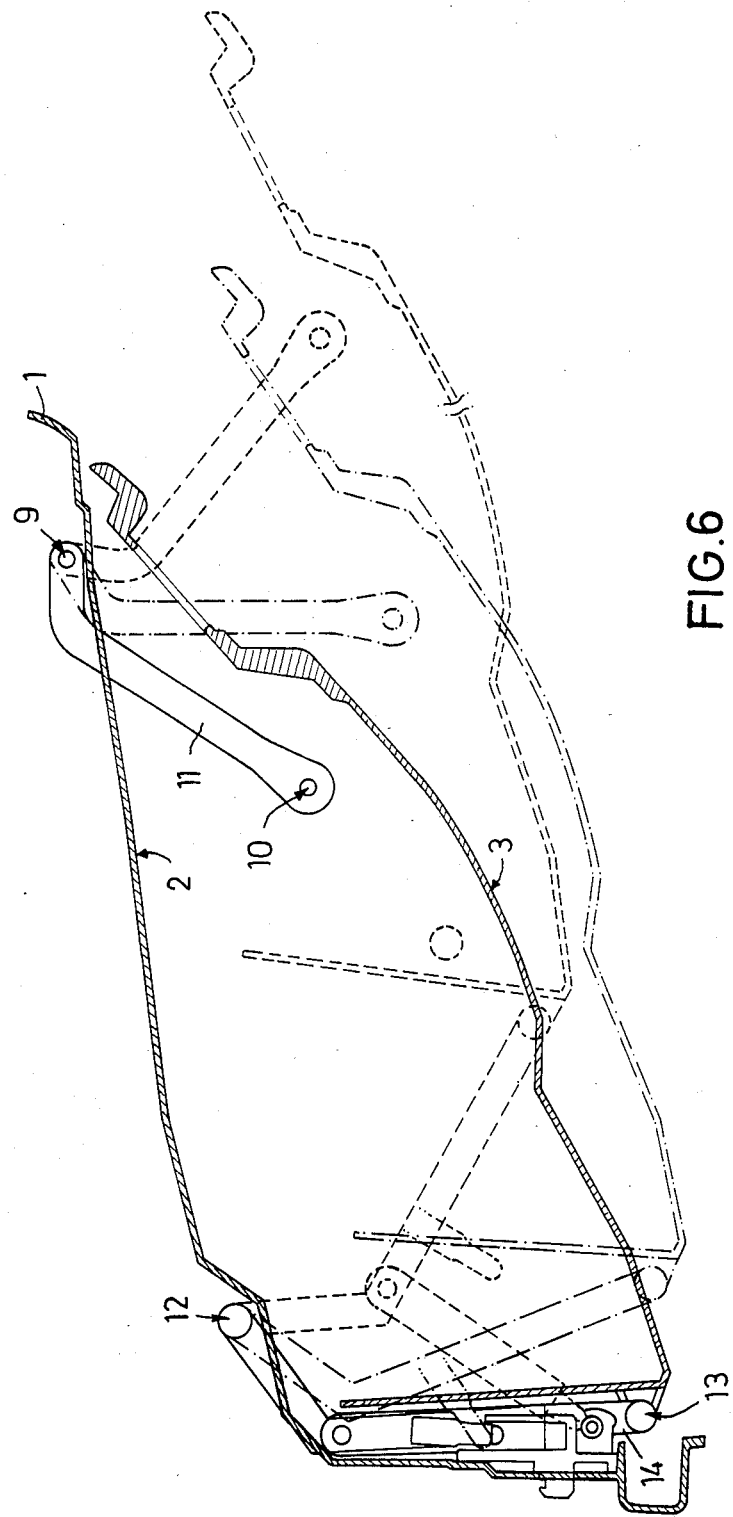
FIG. 6 is a diagrammatic view of the storage apparatus in its closed position (solid lines), in its slightly opened position (dash-dot lines) and in its completely opened position (broken lines) with the corresponding positions of the spring and bell-crank lever arrangement.

In the storage apparatus in the form of a glove compartment disposed inside the instrument panel of a motor vehicle, as shown in FIG. 1, the instrument panel 1 includes a recessed cavity 2 which is occupied by a storage container 3 which is open toward the interior of the panel. The storage container 3 essentially comprises two lateral walls 4, a vertical rear wall 5 and a front wall 6 which adjoins the profile of the panel 1 so as to be flush therewith. The front wall 6 of the storage container 3 comprises in known manner a depression 7 in which is disposed an actuating and closing apparatus indicated generally at 8.

The storage container 3 is suspended by two forward laterally spaced out lever arms 11. The arms 11 are articulated at one end on bearing means 9 mounted on the panel 1 and at the other end on bearing means 10 mounted on the lateral walls 4 of the storage container 3. At its rear, the storage container 3 is suspended by a rear triangularly shaped lever arm 14 articulated at one end by a bearing means 12 mounted on the panel 1 and at the other end by a bearing means 13 mounted on the rear wall 5 of the storage container 3.

The lever arm 14 is, as shown in FIG. 2, constructed in the form of a wishbone having a broad upper base which is angled obliquely upwards and forwards with its upper third, starting from a transverse bar 15. Spring and bell-crank lever arrangements 16, 17, respectively, engage on the transverse bar 15 at one end and on a support mounting 18 on the panel 1 at the other end.

The design of the spring and bell-crank lever or shock absorber arrangement 16 and 17, respectively, is explained in greater detail in conjunction with FIGS. 2, 3 and 4.

As is evident from the view of the triangularly shaped lever arm 14 shown in FIG. 2, a spring arrangement 16 and a bell-crank lever arrangement 17 are arranged between the transverse bar 15 and a support mounting 18.

The spring arrangement 16, as may best be seen in FIG. 3, comprises a cylinder portion 21 which is supported at its upper end by a pivot pin 22 on a bracket 23 on the transverse bar 15 of the triangularly shaped lever arm 14. The interior of the cylinder portion 21 receives a helical compression spring 24, which acts upon a piston component 25 disposed in the lower end of the cylinder portion 21, and the lower end of which is supported in a corresponding cup in the support mounting 18 by a pivot pin 26. In order to prevent the spring arrangement 16 from falling out inadvertently, a pin and slotted guide arrangement 27, 28 is interposed between the cylinder portion 21 and the piston component 25.

The bell-crank lever arrangement 17, as may best be seen in FIG. 4, includes a cylinder portion 31 which is connected to the support mounting 18. The interior of the cylinder portion 31 receives a helical compression spring 32 which loads a piston component 33 disposed in the upper end of the cylinder portion 31. The piston component 33 receives in a corresponding cup a bell-crank lever 36, the upper end of which is supported by a pivot pin 37 on a bracket 38 on the transverse bar 15 of the triangularly shaped lever 14. In order to prevent the bell-crank lever arrangement 17 from falling out, a pin and slotted guide arrangement 34, 35 is provided in a manner similar to that employed with the spring arrangement 16.

As is best seen in FIG. 5, the lateral walls 4 of the storage container 3 are provided with stop members 19 which cooperate with corresponding clipped-on molded stop members 20 on the panel 1 in such a way that an opening movement initiated with the support of the spring arrangement 16 and the bell-crank lever arrangement 17 is limited by the cooperation of the spring and bell-crank lever arrangements 16, 17 and the stop members 19, 20, first in a minimally opened position of the storage container 3, and only after the resistance produced by the spring arrangement 16 has been overcome, can a further opening movement limited by the stop members 19, 20 into the completely opened position of the storage container 3 take place.

The operation of the storage apparatus according to the invention is diagrammatically illustrated in FIG. 6. The outlines of the storage container 3 and the bearings of the spring and bell-crank lever arrangement 16 and 17 respectively being shown in solid lines in the closed position, the outlines of the individual components being shown in dash-dot lines in the only slightly opened position and the outlines being shown in broken lines in the completely opened position.

Initial downward and outward movement of the storage container 3 first releases any cushioning force supplied in the closed position by the spring 32 and compresses the spring 24, while movement is guided by the bell crank lever 36, which is allowed to move in pure pivotal motion with respect to the lever arm 14 through pin 37 and to pivot out of the cup of piston member 33 to rest against a wall portion of the support member 18. Further outward movement of the storage container 3 pulls the bell crank lever 36 away from the piston member 33 and allows expansion of the spring 24 of spring arrangement 16. As the outward movement swings the storage container 3 upwardly about the axes defined by bearing means 9, 10, 12 and 13, the spring member urges the lever arm 14 toward the broken line position of FIG. 6 until movement is arrested by the stops 19, 20.

In the storage apparatus of the present invention, the smooth-finished covering dictated by concerns required for safety in the shaping of an instrument panel of a motor vehicle can be made possible without the accessibility of the glove compartment being rendered difficult or adversely affected to an unacceptable degree. According to the invention, the glove compartment lies flush with the smooth-finished covering and is swung towards the user during opening. In this way, the deposit of or search for articles is made considerably easier.

While only one embodiment of the storage container has been described, others maybe possible without departing from the scope of the invention as defined by the following claims.

What is claimed is:

1. A storage apparatus carried inside interior panels of motor vehicles, having a storage container which is open toward the interior of the panel and which is movable forwardly and downwardly through a guide mechanism arranged in parallelogram fashion by overcoming dead center in a closed position flush with the panel wherein the storage container is spring-mounted by way of lever arms articulated on the panel at one end and on the storage container at the other end and which is operatively connected to a spring and shock absorber arrangement cooperating with the guide mechanism and which is lockable on stop means in an opened position projecting from the panel, characterized in that two forward, laterally outer lever arms and a rear, triangularly shaped lever arm disposed outside of and parallel to the approximately vertical rear wall of the storage container are provided, and a spring and bell-crank lever arrangement engages below on a support point mounting on the panel and above on a transverse bar of the triangularly shaped lever arm.

2. A storage apparatus according to claim 1, further characterized in that the spring arrangement essentially comprises a cylinder portion, a helical compression spring disposed therein and a corresponding piston portion, and the cylinder portion is supported at its upper end by way of a pivot pin on a bracket on a transverse bar of the triangularly shaped lever arm and the piston portion is supported by way of a pivot pin in a corresponding cup in the support mounting, and the bell-crank lever arrangement comprises a cylinder portion rigidly connected to the support mounting and a piston portion which is acted upon by a helical compression spring and which supports in a cup the lower end of a bell-crank lever, the upper end of which is supported by way of a pivot pin on a bracket on the transverse bar on the triangularly shaped lever arm, whereby the actuating forces required to move the container of the storage apparatus are influenced to permit two different opening positions.

3. In a storage apparatus of the type in which a container is carried within the instrument panel of a motor vehicle and having four-bar linkage means interposed between the container and portions of the panel to permit forward and downward movement of the container from a closed position in which outer portions of the container lie flush with portions of the panel to an open position, an improved linkage means comprising:

a pair of forwardly located lever arms spaced laterally outwardly of the container and pivotally connected at their upper ends to portions of the panel and at their lower ends to portions of the container;

a rearwardly located triangularly shaped lever arm having a portion disposed, in the closed position of the container, parallel to and rearward from a substantially vertical rear wall of the container, and pivotally mounted at its upper end to portions of the panel and at its lower end to lower surfaces of the container rear wall;

means defining a transverse bar on the upper end of the triangularly shaped lever arm portion;

a mounting member fixed to a portion of the panel proximate the lower end of the triangularly shaped lever arm; and a spring arrangement and a bell-crank lever arrangement operatively carried between the mounting member and separate portions of the triangularly shaped lever arm proximate the transverse bar, the spring and bell crank lever arrangements defining means for controlling selectable movement of the container from the closed position to a partially open position established by relative pivotal movement of the spring and bell crank lever arrangements and from there to a fully open position under assistance from the spring arrangement.

4. A linkage means as defined in claim 3 and further comprising means defining a forwardly and upwardly canted portion of the triangularly shaped lever arm between its upper end and the transverse bar.

5. A linkage means as defined in claim 3 and further comprising resilient stop means operatively disposed between the container and the panel to arrest further movement of the container outward from its fully opened position.

6. A linkage means as defined in claim 4 and further comprising resilient stop means operatively disposed between the container and the panel to arrest further movement of the container outward from its fully opened position.

7. A linkage means as defined in claim 5 wherein:

the spring arrangement comprises a slidably engaged piston and cylinder arrangement having a spring interposed between piston and cylinder and being pivotally connected at its upper end to a portion of the triangularly shaped lever arm proximate the transverse bar and at its lower end to the mounting member; and the bell crank lever arrangement comprises a second slidably engaged piston and cylinder arrangement having a spring interposed between piston and cylinder and wherein the cylinder is fixedly carried with the mounting member and wherein the top of the piston defines a cup portion for receiving the lower end of a bell crank lever having its upper end pivotally connected proximate the transverse bar;

wherein the partially open position of the container is established by pivotally moving the linkage to a position wherein the bell crank lever pivoting in the piston cup portion to support the container against portions of the mounting member; and wherein the fully open position of the container is established by pivotally moving the linkage to extract the bell crank lever from the cup portion and to permit the spring arrangement to urge the container to a position effecting engagement of the stop means.

8. A slidably engaged piston and cylinder arrangement having a spring interposed between piston and cylinder and being pivotally connected at its upper end to a portion of the triangularly shaped lever arm proximate the transverse bar and at its lower end to the mounting member; and the bell crank lever arrangement comprises a second slidably engaged piston and cylinder arrangement having a spring interposed between piston and cylinder and wherein the cylinder is fixedly carried with the mounting member and wherein the top of the piston defines a cup portion for receiving the lower end of a bell crank lever having its upper end pivotally proximate the transverse bar.

wherein the partially open position of the container is established by pivotally moving the linkage to a position wherein the bell crank lever pivots in the piston cup portion to support the container against portions of the mounting member; and wherein the fully open position of the container is established by pivotally moving the linkage to extract the bell crank lever from the cup portion and to permit the spring arrangement to urge the container to a position effecting engagement of the stop means.

* * * * *